United States Patent [19]

Spies et al.

[11] Patent Number: 5,624,099
[45] Date of Patent: *Apr. 29, 1997

[54] ELASTIC MOUNTING APPARATUS FOR MOUNTING A TURBOCHARGER HOUSING ON AN INTERNAL COMBUSTION ENGINE

[75] Inventors: Karl-Heinz Spies, Birkenau; Willi Schweikert, Heidelberg; Armin Barth, Gorxheimertal; Hans-Gerhard Sander, Weinheim, all of Germany

[73] Assignee: Firma Carl Freudenberg, Germany

[*] Notice: The term of this patent shall not extend beyond the expiration date of Pat. No. 5,501,075.

[21] Appl. No.: 419,332

[22] Filed: Apr. 10, 1995

[30] Foreign Application Priority Data

Apr. 18, 1994 [DE] Germany .................... 44 13 393.6

[51] Int. Cl.⁶ .................. F02B 37/00; F02M 35/10; F02M 13/00; F16L 17/073
[52] U.S. Cl. .................. 248/562; 60/605.1; 123/184.21; 248/621; 248/635; 267/140.2; 267/141.1; 277/207 A
[58] Field of Search .................. 60/605.1; 123/184.21; 248/562, 569, 608, 621, 635, 636, 638; 267/140.2, 141, 141.1, 152, 161, 162, 293, 294; 277/27, 101, 206 A, 207 A, 211, 235 B

[56] References Cited

U.S. PATENT DOCUMENTS

| | | | |
|---|---|---|---|
| 2,305,295 | 12/1942 | Lang et al. | 60/605.1 |
| 4,984,777 | 1/1991 | Kurr et al. | 248/562 X |
| 5,220,889 | 6/1993 | Ampferer et al. | 123/184.21 |
| 5,231,957 | 8/1993 | Eckel et al. | 123/184.21 |
| 5,234,039 | 8/1993 | Aoshima et al. | 285/379 X |
| 5,501,075 | 3/1996 | Spies et al. | 248/621 X |

FOREIGN PATENT DOCUMENTS

| | | | |
|---|---|---|---|
| 409973 | 2/1925 | Germany | 248/569 |
| 2744039 | 4/1979 | Germany | 123/184.21 |
| 2824205 | 12/1979 | Germany | 123/184.21 |
| 4125249 | 2/1993 | Germany . | |

Primary Examiner—Carl D. Friedman
Assistant Examiner—Kevin D. Wilkens
Attorney, Agent, or Firm—Kenyon & Kenyon

[57] ABSTRACT

An elastic mounting apparatus for vibration-decoupled mounting of a turbocharger housing on an internal combustion engine. The mounting apparatus includes a clamping element with two spring elements arranged in a functionally serial relationship. The clamping element joins the housing and the internal combustion engine so as to allow relative vibration between the two. The first spring element includes an annular spring member made of elastomeric material and a second spring element formed by at least one disk spring. The clamping element is penetrated by a clamping screw, and the disk spring can be compressed by the clamping screw in such a way that its spring rate, after compression to the intended preload, is substantially zero. The housing is configured as a turbocharger housing with at least one intake pipe. The intake pipe is braced in a vibration-decoupled and sealing manner on the cylinder head of the internal combustion engine by a sealing element made of an elastomeric material. The clamping screw is threadable into the crankcase of the internal combustion engine. The disk spring includes a disk spring packet with at least four individual springs oriented opposite to one another.

7 Claims, 4 Drawing Sheets

ELASTIC MOUNTING APPARATUS FOR MOUNTING A TURBOCHARGER HOUSING ON AN INTERNAL COMBUSTION ENGINE

BACKGROUND OF THE INVENTION

1. Field of the Invention

The present invention concerns an elastic mounting apparatus for the vibration-decoupled mounting of a housing on an internal combustion engine. The invention includes a clamping element with two spring elements arranged in a functionally serial relationship, such that the clamping element joins the housing and the internal combustion engine to allow relative vibration. The first spring element includes an annular spring member made of elastomeric material and a second spring element formed by at least one disk spring. The clamping element is penetrated by a clamping screw, and the disk spring can be compressed by the clamping screw in such a way that its spring rate, after compression to the intended preload, is substantially zero.

2. Description of the Prior Art

A mounting apparatus is shown in German Publication 41 25 249 A1. This mounting apparatus is provided for joining an intake pipe to an internal combustion engine, where the annular spring member is made of elastomeric material and is arranged in series with a disk spring made of metallic material. The disk spring is preloaded in such a way that its working point, on a spring force/spring travel diagram, lies on the horizontal portion of the substantially S-shaped spring characteristic curve. The working characteristics of the serially disposed spring elements are largely constant, irrespective of ambient temperature. A spring member made of flexible rubber material is provided for damping relatively low-frequency vibrations with large amplitudes, while acoustically troublesome vibrations are isolated by the preloaded disk spring.

SUMMARY OF THE INVENTION

The underlying object of the present invention is to provide a mounting apparatus that it is suitable for vibration-decoupled mounting of a turbocharger housing.

To achieve the objects of the invention, the turbocharger housing has at least one intake pipe, the intake pipe is braced in a vibration-decoupled and sealed manner on the cylinder head of the internal combustion engine by a sealing element made of elastomeric material, the clamping screw is threadable into the crankcase of the internal combustion engine, and the disk spring consists of a disk spring packet with at least four individual springs oriented opposite to one another. The advantage of the present invention is that the turbocharger housing as a whole is joined in a completely vibration-decoupled manner to the internal combustion engine, and the four serially disposed individual springs allow a very soft, resilient attachment of the turbocharger housing to the internal combustion engine. Solid-borne sound insulation from the internal combustion engine to the turbocharger housing thus occurs with particular efficiency in the present invention.

According to an advantageous embodiment, provision is made for the individual springs of the disk spring packet to have, as manufactured, a ratio of spring height h to material thickness s that is at least 1.3. This results in sufficient resilience in the direction of the introduced high-frequency vibrations.

The individual spring facing the spring member can be braced against the spring member by means of a disk-shaped buttress. The advantage of such an arrangement is that the axial height of the clamping element is small, and the spring member on the side facing the individual spring is not exposed to any abrasive wear during vibration isolation. The working characteristics of the mounting apparatus are therefore consistently good during the entire service life. The individual springs of the disk spring packet, as well as the disk-shaped buttress, are preferably made of a metallic material.

The individual spring on the side facing away from the spring member can be braced against a clamping disk joined to the clamping screw. The clamping disk is preferably made of a relaxation-free material.

The clamping element can be arranged in a recess of the turbocharger housing, such that the clamping disk covers the recess substantially completely. After compression to the desired preload so that the working point of the disk spring packet is arranged on the horizontal portion of the S-shaped spring characteristic curve, the disk spring preferably terminates flush with the surface of the turbocharger housing. Because the clamping element is arranged completely countersunk within the recess, protection of the spring elements from contaminants is ensured. Consistently good working characteristics over the entire service life are thereby guaranteed.

The annular spring member preferably has a loss-proofing or retaining feature which consists of at least one projection extending radially inward, such that the projection can snap into a groove-shaped turned channel of the clamping screw. Assembly of the clamping element is substantially simplified thereby, since a separate buttress for the spring member is not required, and the spring members can be preassembled. The two spring elements preferably surround the clamping screw concentrically.

The clamping element can constitute a unit which can be preassembled, such that the unit can be snapped in a loss-proof fashion into the recess of the turbocharger housing. The clamping element can be delimited, on the end surface facing the turbocharger housing, by the spring member, which has a projection extending in the axial direction which passes conformingly through an orifice penetrating the turbocharger housing in the region of the recess. The recess is preferably arranged in a mounting flange of the turbocharger housing. Because the projection passes conformingly through the orifice, there exists the possibility of storing the turbocharger already preassembled with the clamping element, such that the two preassembled parts can, if necessary, be mounted together on the internal combustion engine. The mounting apparatus according to the invention is therefore easy to assemble.

BRIEF DESCRIPTION OF THE DRAWINGS

The invention will be explained in more detail below with reference to the drawings, in which.

DETAILED DESCRIPTION OF THE DRAWINGS

Figure 1:
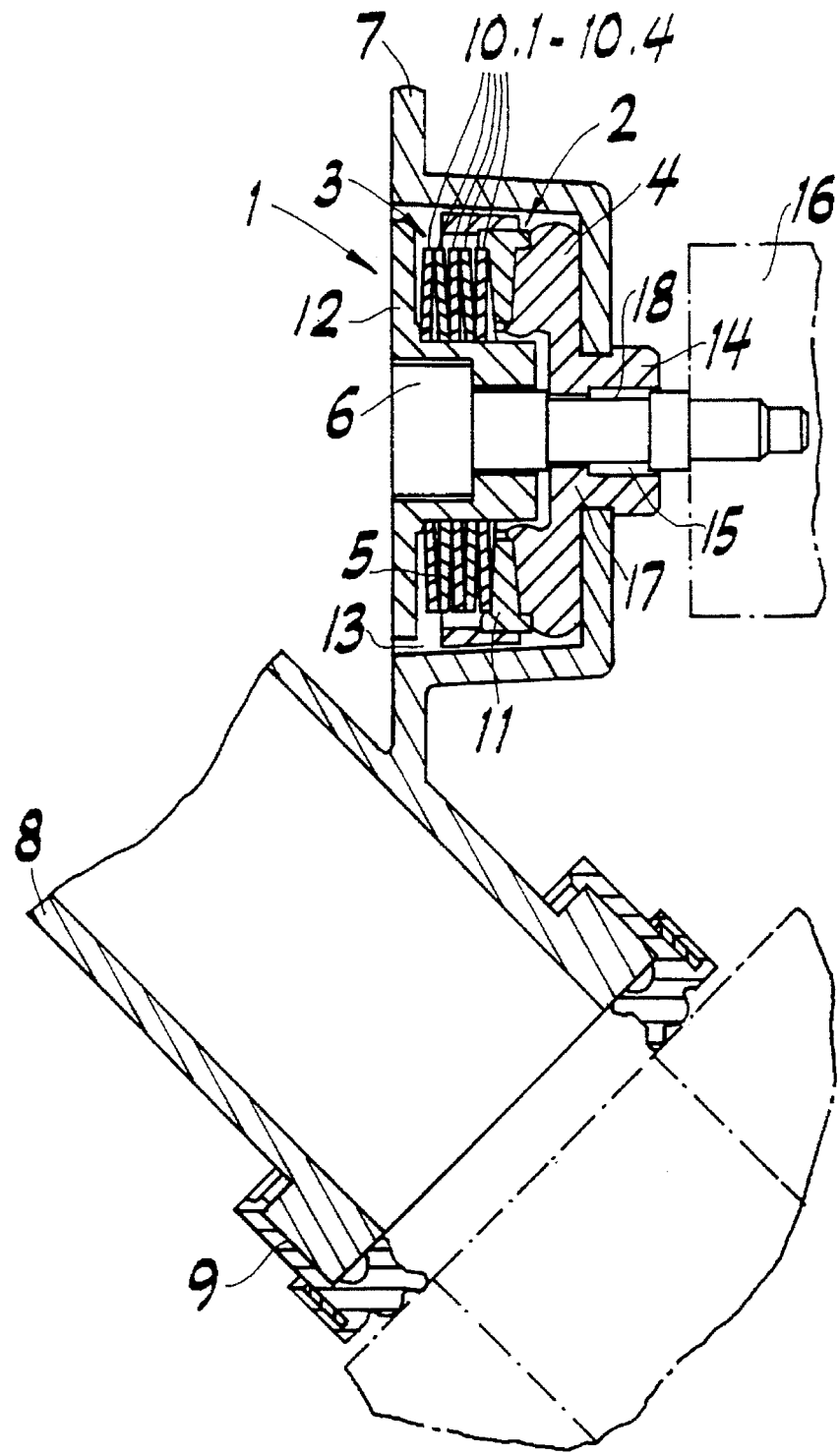
FIG. 1 shows a section of a turbocharger housing and the mounting apparatus that is used.

FIG. 1 shows a cross-section of a turbocharger housing 7 that can be mounted in a vibration-decoupled manner, by means of an elastic mounting apparatus, to an internal combustion engine 16. Turbocharger housing 7 is made of a polymeric material and is provided with a recess 13 in which clamping element 1 is arranged. Clamping element 1 has two spring elements 2, 3 arranged in series, first spring element 2 consisting of an annular spring member 4 made of an elastomeric material. In this depiction, clamping element 1 is shown in the clamped state, when turbocharger housing 7 is installed on internal combustion engine 16. The second spring element 3 consists of a disk spring packet configured as a disk spring 5, the disk spring packet comprising four individual springs 10.1, . . . , 10.4 oriented opposite to one another. In the uncompressed state, individual springs 10.1, . . . . 10.4 each have a ratio of spring height h to material thickness s that in this case equals 2.5. Individual springs 10.1, . . . , 10.4 are braced on the side facing spring member 4 against a disk-shaped buttress 11, and on the axially opposite side against a clamping disk 12. Clamping screw 6, which penetrates centrally through spring elements 2, 3, is threaded into a mounting eye of the crankcase of internal combustion engine 16 in such a way that the working point of the spring characteristic curve of the disk spring packet lies on the horizontal portion of the S-shaped spring characteristic curve in a spring force/spring travel diagram. Because of the compression, spring member 4 is arranged inside clamping element 1 under elastic preload. Slight sagging phenomena during utilization of the mounting apparatus as intended are compensated for by the four individual springs 10.1 . . . . , 10.4 of disk spring 5. Intake pipe 8 is provided with a sealing element 9 made of an elastomeric material, and applied sealingly to the cylinder head of the internal combustion engine under elastic preload.

Figure 2:
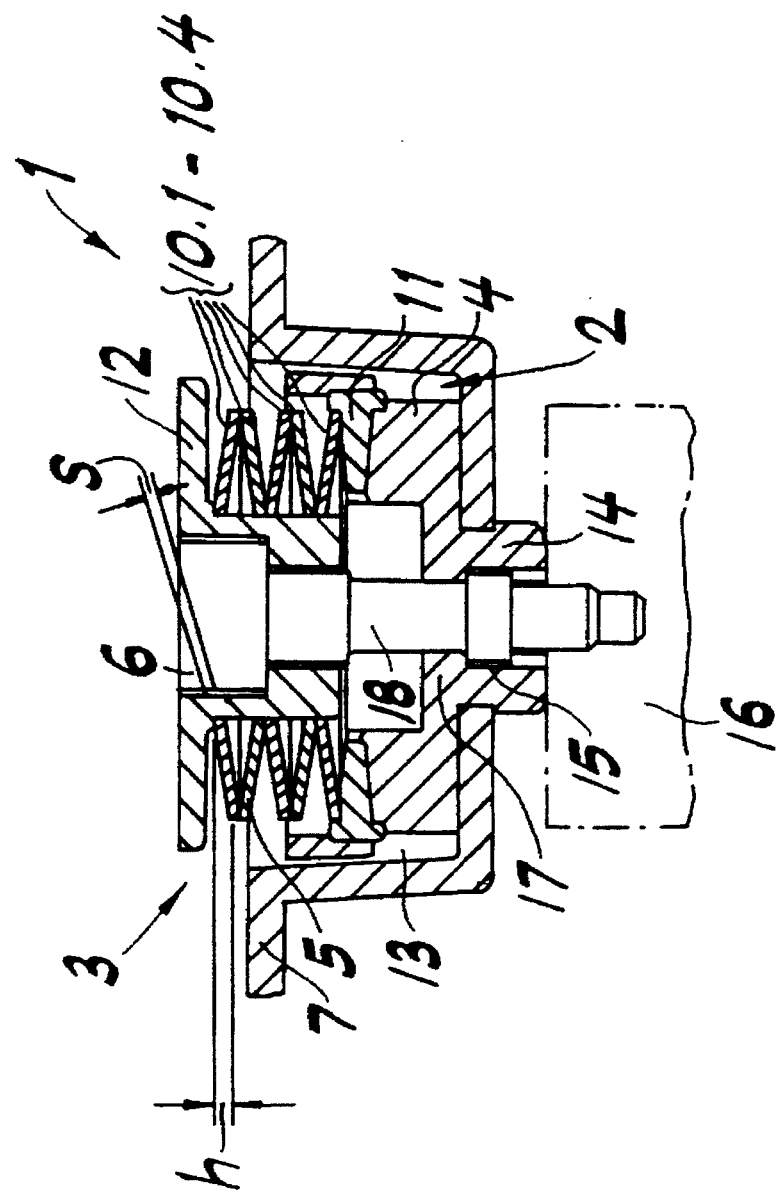
FIG. 2 shows an enlarged section of the clamping element in the uncompressed state.

FIG. 2 shows the clamping element of FIG. 1 in an enlarged depiction, in the non-preloaded state. It is evident from this figure that spring member 4 is held internally in the radial direction in clamping screw 6 by turned channel 18 and a projection 17. Spring member 4 additionally has a projection 14 that passes conformingly through an orifice 15 of turbocharger housing 7 arranged inside recess 13. A configuration of this kind ensures that turbocharger housing 7 and clamping element 1 form a unit which can be preassembled and mounted on the internal combustion engine.

Figure 3:
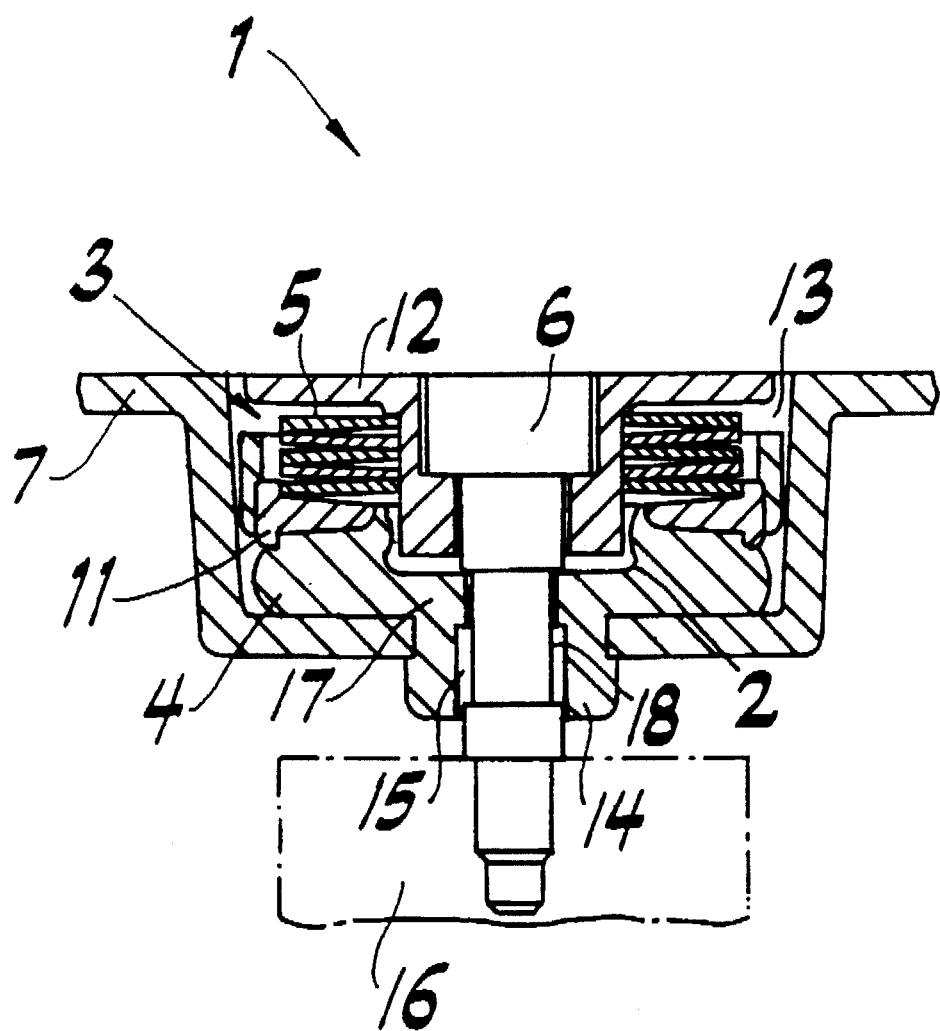
FIG. 3 shows the clamping element from FIG. 2, in the preloaded state.

FIG. 3 shows the unit of FIG. 2 in the compressed state. It is evident that spring member 4 is elastically deformed within clamping element 1 by the preload. Individual springs 10.1, . . . , 10.4 of the disk spring packet are also compressed, such that clamping disk 12 terminates in a position flush with the surface of turbocharger housing 7. This configuration largely protects spring elements 2, 3 arranged inside recess 13, from contaminants, thus ensuring consistently good, vibration-decoupled mounting of the turbocharger housing during its entire service life.

Figure 4:
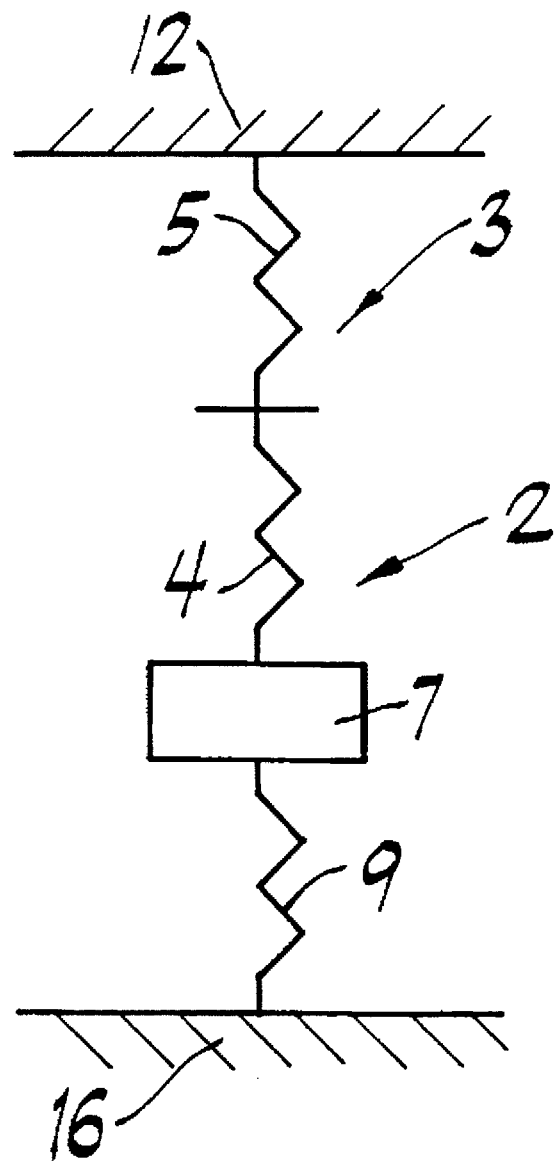
FIG. 4 shows the equivalent diagram for the mounting apparatus according to the invention.

FIG. 4 shows an schematic equivalent diagram of the mounting apparatus of the present invention. It is evident that spring elements 2, 3 of clamping element 1 are arranged in a functionally serial relationship, such that freely vibrating turbocharger housing 7 constitutes the mass. Sealing element 9 is arranged between turbocharger housing 7 and the cylinder head of internal combustion engine 16. Sealing element 9 is mounted and designed so that a boost pressure of at least 3 bars can be perfectly sealed. Because turbocharger housing 7 is suspended in a freely vibrating manner, solid-borne sound is not transmitted from the internal combustion engine to turbocharger housing 7. The entire mounting apparatus is also very easy to install.

We claim:

1. An apparatus for mounting a turbocharger housing including an intake pipe on an internal combustion engine comprising:

a clamping element comprising a first spring element and a second spring element arranged in series, said clamping element connecting said housing to said internal combustion engine so as to allow relative vibration between said housing and said internal combustion engine, said first spring element comprising at least one annular spring member made of an elastomeric material, said second spring element comprising at least four disk springs, each said disk spring being oriented in a direction opposite to that of an adjacent disk spring;

a clamping screw, said second spring element being compressible by said clamping screw such that a spring rate of said second spring element, after compression to an intended preload, is substantially zero, said clamping screw being connectable to a crankcase of said internal combustion engine; and a sealing element of an elastic material connecting said intake pipe to a cylinder head of said internal combustion engine.

2. The apparatus of claim 1, wherein:

said at least four disk springs each have, as manufactured, a ratio of spring height h to material thickness s of at least 1.3.

3. The apparatus of claim 1, wherein:

said disk spring adjacent said first spring element is braced against said first spring element by a disk-shaped buttress.

4. The mounting apparatus of claim 1, wherein:

said disk spring adjacent an end of said clamping screw is braced against a clamping disk joined to said clamping screw.

5. The mounting apparatus of claim 4, wherein:

said clamping element is arranged in a recess of said turbocharger housing, and wherein said clamping disk covers said recess.

6. The mounting apparatus of claim 1, wherein:

said clamping element comprises a preassembled unit, and wherein said unit can be snapped in a into a recess of said turbocharger housing.

7. The mounting apparatus of claim 1, wherein:

said first spring element defines a first end of said clamping element adjacent said turbocharger housing, said first spring element comprising a projection extending in an axial direction passes through an orifice in said turbocharger housing.

* * * * *